United States Patent
Smith et al.

(10) Patent No.: US 11,504,885 B2
(45) Date of Patent: Nov. 22, 2022

(54) METHOD FOR COOLING THIN CORES IN PLASTIC MOLDS

(71) Applicant: Messer Industries USA, Inc., Bridgewater, NJ (US)

(72) Inventors: Edward C. Smith, Sterling Heights, MI (US); Mikael Orsén, Trelleborg (SE)

(73) Assignee: Messer Industries USA, Inc., Wilmington, DE (US)

( * ) Notice: Subject to any disclaimer, the term of this patent is extended or adjusted under 35 U.S.C. 154(b) by 502 days.

(21) Appl. No.: 15/404,479

(22) Filed: Jan. 12, 2017

(65) Prior Publication Data

US 2017/0203475 A1 Jul. 20, 2017

Related U.S. Application Data

(60) Provisional application No. 62/278,486, filed on Jan. 14, 2016.

(51) Int. Cl.
| | | |
|---|---|---|
| *B29C 33/04* | (2006.01) | |
| *F25B 19/00* | (2006.01) | |
| *F25B 41/37* | (2021.01) | |
| *B29K 101/12* | (2006.01) | |

(52) U.S. Cl.
CPC .......... *B29C 33/046* (2013.01); *F25B 19/005* (2013.01); *F25B 41/37* (2021.01); *B29K 2101/12* (2013.01); *F25B 2341/062* (2013.01)

(58) Field of Classification Search
CPC .. B29C 2035/165; B29C 33/046; F25B 41/37
USPC .................................................. 264/324.16
See application file for complete search history.

(56) References Cited

U.S. PATENT DOCUMENTS

| | | | | |
|---|---|---|---|---|
| 5,890,745 | A * | 4/1999 | Kovacs | B01L 3/565 204/451 |
| 6,537,053 | B1 * | 3/2003 | Watkins | B29C 43/42 249/68 |
| 6,638,455 | B1 * | 10/2003 | Bodmer | B29C 33/044 249/79 |
| 2006/0010884 | A1 * | 1/2006 | Hutchison | B29C 35/16 62/63 |
| 2009/0014914 | A1 * | 1/2009 | Praller | B29C 33/046 264/328.14 |
| 2017/0203481 | A1 * | 7/2017 | Navarra Pruna | B29C 33/46 |
| 2017/0355118 | A1 * | 12/2017 | Starkey | B29C 45/72 |

OTHER PUBLICATIONS

English translation of EP2452800 (Year: 2012).*
English Translation of EP2433776. Mar. 28, 2012 (Year: 2012).*

* cited by examiner

*Primary Examiner* — Matthew J Daniels
*Assistant Examiner* — Hana C Page
(74) *Attorney, Agent, or Firm* — Joshua L. Cohen

(57) ABSTRACT

A method for cooling a mold used in the production of plastic parts is described. A capillary feeds liquid carbon dioxide to a channel present in the mold typically used in making plastic parts having thin gaps or thin open sections in the plastic part. The channel will be approximately the same size as the inner diameter of the capillary but will increase in size either stepwise or progressively as it passes through the mold, particularly at the location where cooling is desired therefore providing more effective cooling to the mold and slides and lifters present therein.

9 Claims, 2 Drawing Sheets

METHOD FOR COOLING THIN CORES IN PLASTIC MOLDS

CROSS REFERENCE TO RELATED APPLICATIONS

This application claims priority from U.S. Provisional Application 62/278,486 filed on Jan. 14, 2016.

BACKGROUND OF THE INVENTION

During the production of plastic parts through molding operations, they are processed and ejected after they have cooled down to a certain temperature. The length of time that it takes for each part to cool accounts for the better part of the production cycle time. A cycle time that is too long will be detrimental to efficiency and profitability.

For small or thin cores, the problems are exacerbated. Typically channels are made in a two piece laminated core where the two pieces are welded together and water is run through the channel. Unfortunately, these small channels can clog in short order due to mineral content in the water, organic compound content or a combination of both. These cores are usually 0.060 inches (0.15 cm) thick at the end and may be as large as 0.090 inches (0.22 cm) with draft included. The water channels therefore are generally 0.030 inches (0.07 cm) or smaller in diameter. Carbon dioxide reduces the clogging as it is a cleaning agent keeping the small channels open.

A second issue with a two piece design is that there is risk in the weld failing between the two halves and leaking water into the mold. Lastly a closed circuit loop is needed to attach the closed cooling loop to a chiller and/or water tower to function properly.

Alternatively, another method is to blow cooled air on the cores between shots of resin. However, this only allows for cooling while the mold is open and not when it is needed most as during the resin injection, pack and hold phase of the plastics production process.

This also impacts on cooling water being used for lifters and slides. It is difficult to get the water into lifters and slides in injection molds due to their size or configuration. It is also difficult to get a spot mold cooling capillary into slides and lifters due to the motion involved in their operation. One means of addressing cooling for these operations is to place the capillaries into the mold ending adjacent to the slide or lifter requiring cooling. The hole or channels in the slides or lifters would be larger than the capillary thereby allowing for expansion of the carbon dioxide to provide cooling to the lifter or slide.

These shortcomings can be overcome with the methods of the present invention.

SUMMARY OF THE INVENTION

In one embodiment of the invention, there is disclosed a method for cooling a mold used in production of plastic parts comprising feeding liquid carbon dioxide through a capillary to a channel present in the mold wherein the channel increases in size to dimensions that are greater than the capillary as the channel progresses into the mold.

In another embodiment of the invention, there is disclosed a method for cooling slides and lifters present in a mold used in production of plastic parts comprising feeding liquid carbon dioxide to the slides and lifters through a capillary to a channel present in the mold wherein the channel increases in size to dimensions that are greater than the capillary as the channel progresses into the mold.

In these embodiments, the channel is the same size as the capillary before the increase in size.

The carbon dioxide liquid is fed through a capillary to a channel that is present in the mold to be cooled. The channel is the same size as the inner diameter capillary and this channel will increase in size to dimensions that are greater than those of the capillary as the channel progresses into the mold.

The increase in size typically is in a specific location in the mold where the operator desires for cooling to begin. The expansion of the liquid into its gas phase provides the cooling due to the phase transition of the liquid to a gas at the appropriate location. Keeping the channel size approximately the same as the inside diameter of the capillary allows for the operator of the mold to provide the liquid carbon dioxide to the area where the operator desires cooling to start. By expanding the channel at that location from the diameter of the capillary and then allowing the gas to exit through one or more channels carries the cooling effect along the path.

A single channel can be employed in the methods of the present invention but more than one channel may also be used to provide cooling.

The tolerances between the capillary and channel will be designed to limit expansion and direct the liquid carbon dioxide to the area where expansion to the gas phase and cooling are desired.

Typically the applications for cooling by the methods of the present invention are in areas where the capillary is too large to reach. The capillary is essentially being extended by using a hole in the mold which is the same size as the inside diameter of the capillary. The capillary thus connects with the desired channel or channels and allows for the expansion of the carbon dioxide liquid to gas thereby creating cooling at the spot where cooling is needed in the mold.

The plastics that are typically cooled by the methods of the present invention are thermoplastics.

The carbon dioxide will be fed from a liquid carbon dioxide source such as a cylinder or bulk container with the pressure of about 800 to 1000 pounds per square inch (psi) to provide for liquid that is relatively bubble free. Preferably, the pressure is about 900 psi. This liquid carbon dioxide stream will be fed to a solenoid that is controlled by an SMC (system management controller). This will ensure that the carbon dioxide liquid reaches the desired area of cooling as a liquid and expands at that location to a gas.

Typically, the channel that connects to the capillary will have approximately the same dimensions as the capillary. As the channel progresses further into the mold its size will increase to dimensions larger than the capillary. This increase can be either progressive or it can be in one step at a time. By progressive, it is meant that the size of the channel increases in a gradual manner. By one step at a time, it is meant that the channel will increase in size and remain that increased size further into the mold. The channel may then increase in size one or more times, each increase being for a length of channel into the mold until a next increase, if any is made to the channel. This increase will have a ratio that is greater than 2 to 1 and less than 5 to 1 channel to capillary ratio thereby providing for the expansion of the liquid carbon dioxide to gas.

The molds will produce plastic parts that are made from plastics selected from the group consisting of polypropylene with or without glass reinforcement, polyethylene with or without glass reinforcement, polyamides with or without glass reinforcement, acryl-butadiene-styrene, poly carbonates and mixtures thereof. Virtually any thermoplastic resin can be treated by the methods of the present invention.

The mold will typically be any type of mold for producing plastic parts. This can include standard injection molds, gas assist injection molds, foaming molds, etc. that are used in the production of thermoplastic plastic parts and pieces. Typically in injection molding, melted plastic is forced into a mold cavity. Once cooled, the molded article can be removed. The cooling therefore is the reduction in temperature from when the plastic is in a melted state in the mold to when the mold can be opened and the now solid plastic part or piece can be removed without risking the structural integrity of the plastic part or piece.

DETAILED DESCRIPTION OF THE INVENTION

Liquid carbon dioxide is fed through capillaries to one or more channels that are present in a mold, such as a blade style manifold that is used in the production of thin gaps or thin open sections in plastic parts. The liquid carbon dioxide is fed through a capillary into the channel where the carbon dioxide will be delivered to the location within the mold where cooling is desired. The channel will have the same approximate dimensions as inner diameter of the capillary and it will progress into the mold. As this progression occurs, the channel will increase in dimensions to a size greater than the capillary. This is performed in a singular step or progressively as the channel progresses the mold. This increase in size will allow for the expansion of the liquid to a gas (phase transition) cooling to contact the particular location within a mold where cooling is desired. This can take place in small or thin cores as well as to provide cooling to slides and lifters.

Thus, the present invention will reduce production cycle times and allow for cooling in molds that previously were not able to be cooled. The open circuit design allows for the liquid carbon dioxide to enter the gas phase and be dispersed rather than having a closed circuit with running cooling water.

For example, 0.060 inch cores were employed in a mold and were able to reduce cycle times from over 22 seconds to below 15 seconds.

Figure 1:
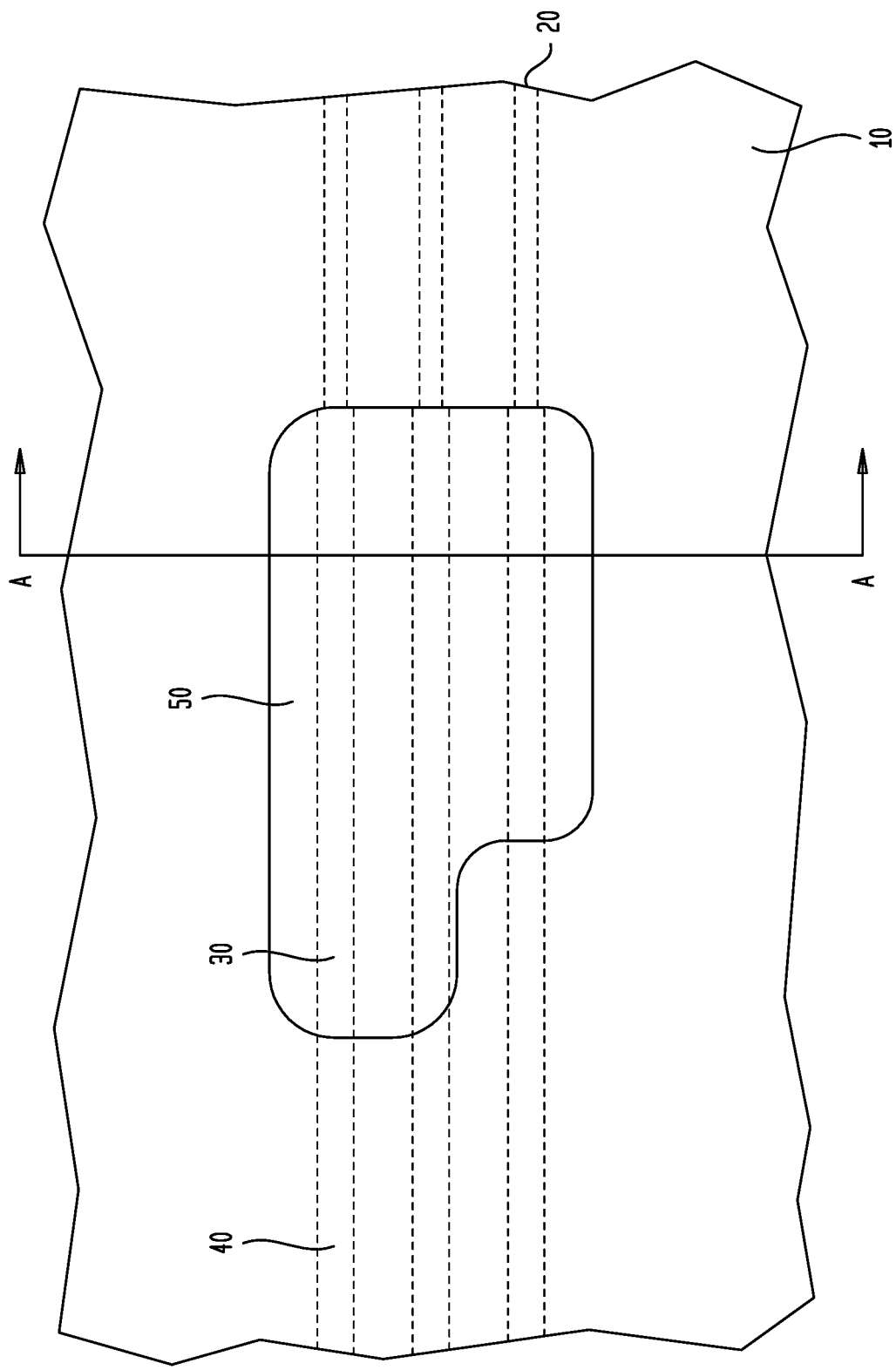
FIG. 1 is a schematic representation of a lifter or slide present in a mold showing the positions of the capillaries in relation thereto.

Turning to the figures, FIG. 1 is a schematic representation of a mold showing the position of a lifter or alternatively a slide in relation to the capillary holes to the mold and the lifter or slide. A cross sectional line A passes through the mold and lifter or slide. A mold 10 contains a series of capillaries or holes 20. These capillaries or holes 20 will have the same size internal diameter as they pass from the mold 10 to the lifter or slide 50. As they pass through the mold 10 and into the lifter or slide 50 they will expand 30 in diameter as they progress through the lifter or slide 50 to provide cooling. The carbon dioxide that is fed through the capillary or holes 20 will expand when it encounters the expanded diameter holes 30 and provide the cooling. The expanded carbon dioxide will then pass through the mold 10 and be exhausted through lines 40.

Figure 2:
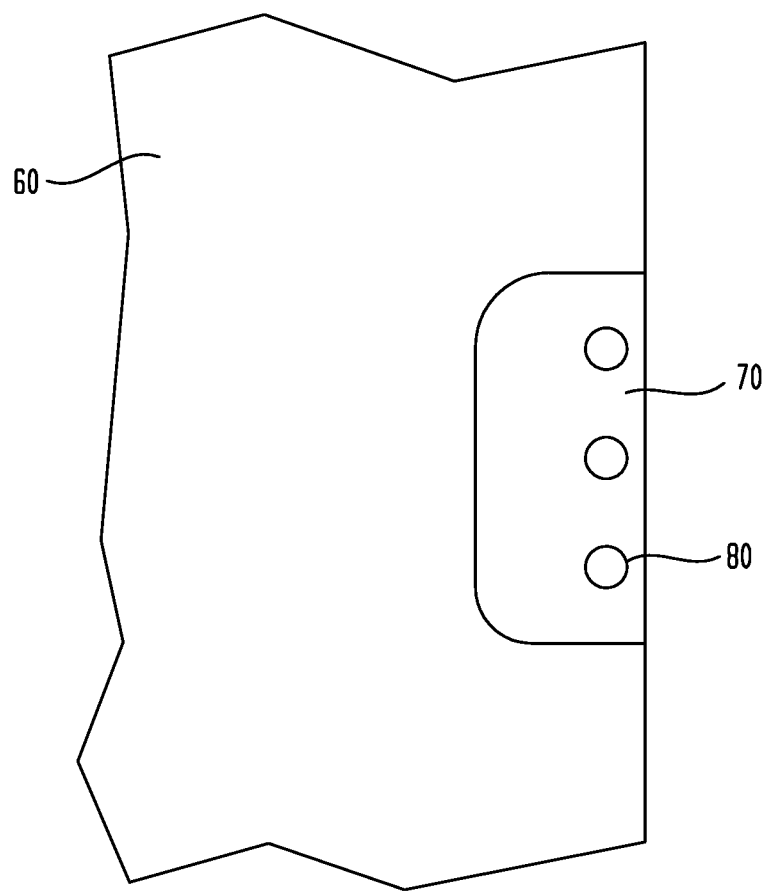
FIG. 2 is a schematic cross-sectional representation of the mold along line A-A in FIG. 1.

FIG. 2 is the cross sectional designation A from FIG. 1. The cross section shows a portion of the mold 60 and a lifter or slide 70. The expansion holes 80 are shown at the point where they have expanded to provide the necessary cooling to the lifter or slide. The expansion holes can be made using additive manufacturing to accommodate curved lifters or slides to provide conformal cooling.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for cooling slides and lifters present in a mold used in production of plastic parts, comprising:
   providing a mold to be cooled for producing plastic parts, the mold including slides and lifters in the mold;
   feeding liquid carbon dioxide through an inner diameter of a capillary connected to a channel present in the mold to be cooled, wherein the channel is of a same size as the inner diameter of the capillary at a position before the channel progresses into the mold;
   increasing the size of the channel to be larger than the inner diameter of the capillary at another position inside a slide or lifter where cooling is needed, dimensions of the channel at the another position becoming greater than the inner diameter of the capillary as the channel progresses from the another position; and
   expanding the liquid carbon dioxide to a gas beginning at the another position in the channel for the cooling to begin and continue along as the channel progresses in the mold.

2. The method as claimed in claim 1 wherein the increasing the size of the channel is progressive.

3. The method as claimed in claim 1 wherein the increasing the size of the channel is stepwise.

4. The method as claimed in claim 1 wherein more than one channel is present in the mold.

5. The method as claimed in claim 1 wherein the feeding of the liquid carbon dioxide is at a pressure of 800 to 1000 pounds per square inch.

6. The method as claimed in claim 1 wherein the increasing the size of the channel is at a ratio greater than 2 to 1 and less than 5 to 1 channel to capillary.

7. The method as claimed in claim 1 wherein the plastic parts are selected from the group consisting of thermoplastics parts, polypropylene with glass reinforcement, polypropylene without glass reinforcement, polyethylene with glass reinforcement, polyethylene without glass reinforcement, polyamides with glass reinforcement, polyamides without glass reinforcement, acryl-butadiene-styrene, polycarbonates, and mixtures thereof.

8. The method as claimed in claim 1 wherein the mold is selected from the group consisting of injection molds, gas assist injection molds, and foaming molds.

9. The method as claimed in claim 1 wherein the cooling further comprises reducing a temperature from when the plastic parts are in a melted state to a temperature when the mold can be removed.

* * * * *